US010165782B2

(12) United States Patent
Schimitzek

(10) Patent No.: US 10,165,782 B2
(45) Date of Patent: Jan. 1, 2019

(54) DEVICE FOR OPTICALLY IDENTIFYING THE SEX OF A SLAUGHTER PIG

(71) Applicant: CSB-SYSTEM AG, Geilenkirchen (DE)

(72) Inventor: Peter Schimitzek, Geilenkirchen (DE)

(73) Assignee: CSB-System AG, Geilenkirchen (DE)

( * ) Notice: Subject to any disclaimer, the term of this patent is extended or adjusted under 35 U.S.C. 154(b) by 3 days.

(21) Appl. No.: 15/328,154

(22) PCT Filed: Jul. 16, 2015

(86) PCT No.: PCT/DE2015/000355
§ 371 (c)(1),
(2) Date: Jan. 23, 2017

(87) PCT Pub. No.: WO2016/011992
PCT Pub. Date: Jan. 28, 2016

(65) Prior Publication Data
US 2018/0035679 A1 Feb. 8, 2018

(30) Foreign Application Priority Data

Jul. 22, 2014 (DE) .................... 20 2014 005 891 U

(51) Int. Cl.
*G06K 9/00* (2006.01)
*A22B 5/00* (2006.01)
(52) U.S. Cl.
CPC .......... *A22B 5/007* (2013.01); *G06K 9/00362* (2013.01)

(58) Field of Classification Search
CPC ..................................................... G06K 9/00
See application file for complete search history.

(56) References Cited

U.S. PATENT DOCUMENTS

| 2004/0023612 | A1* | 2/2004 | Kriesel | A01K 11/008 |
| | | | | 452/157 |
| 2007/0215052 | A1* | 9/2007 | Metcalfe | A01J 5/0175 |
| | | | | 119/14.08 |
| 2011/0279650 | A1 | 11/2011 | Liao et al. | |
| 2013/0322699 | A1* | 12/2013 | Spicola, Sr. | G01G 9/00 |
| | | | | 382/110 |
| 2014/0029808 | A1* | 1/2014 | Lee | G06K 9/00362 |
| | | | | 382/110 |

(Continued)

FOREIGN PATENT DOCUMENTS

| DE | 19700212 A1 | 7/1997 |
| EP | 2168430 A1 | 3/2010 |
| EP | 2698763 A1 | 2/2014 |

*Primary Examiner* — Kim Y Vu
*Assistant Examiner* — Molly Delaney
(74) *Attorney, Agent, or Firm* — Laurence A. Greenberg; Werner H. Stemer; Ralph E. Locher

(57) ABSTRACT

The invention relates to a device for optically identifying the sex of a slaughter pig with a depth camera that has a depth camera acquisition region in which a genital region of the pig and spatial coordinates of pixels are acquired. The spatial coordinates are provided in a transmittable manner and include a positioning device to position the depth camera relative to the genital region of the pig. The device includes an evaluation unit connected to the depth camera. The spatial coordinates are acquired by the evaluation unit to determine a phenotypic sex of the pig.

7 Claims, 4 Drawing Sheets

(56) References Cited

U.S. PATENT DOCUMENTS

2015/0146939 A1* 5/2015 Datta ................... A01K 67/00
    382/110
2016/0125276 A1* 5/2016 Spicola, Sr. ......... A01K 11/008
    382/110

* cited by examiner

DEVICE FOR OPTICALLY IDENTIFYING THE SEX OF A SLAUGHTER PIG

BACKGROUND OF THE INVENTION

Field of the Invention

The invention relates to a device for optically identifying the sex of a slaughter pig on the basis of phenotypic sex features.

The present invention is based in particular on the general problem that male slaughter pigs often have an intrinsic smell, which is strong and generally undesirable for meat processing, the so-called boar scent.

It is therefore necessary for the valuation and the corresponding further processing of the respective slaughter pig for either the odor of the slaughter pig or its sex to be ascertained.

An odor ascertainment is technically complex and therefore comparatively costly and time-consuming in this case, however, in particular if it is carried out on all slaughter pigs in a slaughter pig processing facility, to thus exclude the undesired boar scent before the corresponding further processing of the slaughter pigs.

Alternatively, the sex of the slaughter pig can be determined in the preparation for the processing thereof, to thus be able to exclude a potential odor to be expected of the slaughter pig.

One possible way of determining the sex is, for example, to have this carried out manually by corresponding personnel and subsequently to supply the slaughter pigs to the corresponding matching processing unit.

Such manual sex determination is linked in particular to a high level of effort by personnel and correspondingly high personnel costs, however.

Methods for optically capturing features of living pigs are known from the prior art. In this regard, for example, a method for monitoring pigs is disclosed in document EP 2 168 430 A1, which provides an optical capture system in a monitoring station, by means of which physical measured values of a pig standing in the monitoring station can be captured and provided so they are analyzable. The pig is subsequently typed on the basis of the captured physical measured values. Typing according to sex is also described in this case, wherein the characteristics of the physique such as trunk length, shoulder width, form of the thighs, etc., are used for this purpose.

The method described here disadvantageously causes uncertainty as a result of the race-specific and exemplary scattering of the physical dimensions and proportions.

Furthermore, performing a sex determination in the case of slaughter pigs on the basis of the fat level or the attached meat on the belly is known from the prior art. Such methods are also linked to limited determination reliability.

SUMMARY OF THE INVENTION

The object of the present invention is to provide a device for automatic, rapid, and simultaneously efficient and cost-effective classification of the phenotypic sex of a slaughter pig within a slaughter pig processing facility.

The object is achieved by a device for optically identifying the sex of a slaughter pig having the features set forth in the independent claim. Preferred refinements result from the dependent claims.

All variants of slaughter pigs, in particular independently of the sex, are understood hereafter as a slaughter pig.

The differentiation into male uncastrated (also called boar or intact boar), male castrated (also called barrow), male having entirely or partially internal testicles (also called cryptorchid boar), and female (also called sow) is understood as the phenotypic sex.

The determination of the phenotypic sex is understood as classification in the meaning of the present application.

The slaughter pig to be determined according to phenotypic sex is guided hanging on a tubular rail in the processing facility.

The slaughter pig is preferably accommodated with the hind legs on hooks, which are located adjacent to one another in the movement axis, whereby the surface of its genital region is essentially aligned so that it is visible from a viewpoint orthogonal to the tubular rail. All regions of the surface of a slaughter pig, on which male or female sex organs are positioned, are understood as the genital region in the meaning of this invention, so that spatially different regions can be affected depending on whether female or male slaughter animals are provided. The capture described hereafter of the genital region of the slaughter pig is performed before the division.

A device according to the invention for optically identifying the sex of a slaughter pig has a depth camera having a depth camera capture region, wherein the genital region of the slaughter pig can be optically captured within the depth camera capture region and wherein spatial coordinates of pixels can be captured within the depth camera capture region.

The spatial coordinates of the captured pixels are composed in the present case of the surface coordinates (x, y) thereof and a depth value (z) and are provided in transmittable form by the depth camera.

The capture of the pixels by the depth camera is performed in real-time according to the invention. A depth camera is preferably capable in this case of capturing the pixels with the spatial coordinates thereof in the depth camera capture region simultaneously or in such a short period of time that the movement of the slaughter pig by means of the tubular rail does not impair the capture of an analyzable image.

The device according to the invention furthermore has a positioning device, by means of which the depth camera is positionable relative to the genital region of the slaughter pig.

The positioning of the depth camera in relation to the slaughter pig is preferably performed in this case such that a vertical optical capture of the genital region is enabled, i.e., oriented from above onto the hanging slaughter animal. It has been found in this context that in the case of a vertical optical capture of the genital region, the depth differences which can be captured have their maximum formation and therefore in this manner an optimum capture of the sex features of the slaughter pig can be provided. However, positioning of the depth camera diagonally from above is also possible.

As a further feature, the device according to the invention has an analysis unit, which is connected in a wired or wireless manner to the depth camera and by means of which the spatial coordinates provided by the depth camera can be captured as a 3D image of the genital region. On the basis of the spatial coordinates of the 3D image, the analysis unit is capable of ascertaining the phenotypic sex of the slaughter pig and therefore classifying it accordingly. In this case, the features essential for identifying the phenotypic sex are extracted from the spatial coordinates and subsequently the classification of the slaughter pig is preferably carried out on the basis of a heuristic decision rule or on the basis of a previously defined classifier.

The result of the classification of the slaughter pig can be output by the analysis unit, for example, by means of a code or as clear text or can be provided to external units, for example, sorting units, as a control signal for further processing of the slaughter pig. Furthermore, the classification result can be stored in an internal or external database with assignment to an identification code of the slaughter pig. Furthermore, for evidence purposes or for checking the classification result, a 3D image obtained by the depth camera can be stored with assignment to the identification code of the slaughter pig.

The invention is based on the identification of the spatial formation of the external sex organs of the slaughter pig.

As a special advantage, the analysis unit is furthermore capable of performing a differentiation between the slaughter pig and an environment background solely on the basis of the depth values of captured spatial coordinates, without requiring additional means. The advantage that in particular no background panel or special lighting is required is linked thereto.

As a further advantage, no means are required for precise distance positioning of the slaughter pig, because the information about the distance is already provided by the depth value captured by the depth camera and can be incorporated into the analysis.

Furthermore, as a further advantage, an initialization of the capture and subsequent classification can take place without additional means. For this purpose, the depth camera is preferably arranged in relation to the slaughter pig so that in addition to the genital region, the thigh attachments of the slaughter pig can also be captured. When the slaughter pig is guided past the device according to the invention, in the present case, the analysis unit differentiates between distant depth values of captured pixels of the environment background and close depth values of captured pixels of the slaughter pig. In this manner, as a special advantage of the device, a detection of the movement of the slaughter pig on the tubular rail can be performed by the analysis unit and, upon recognition of the slaughter pig on the basis of the changing depth values, an initialization of the sex region capture can be carried out. Additional devices or measures for initialization can therefore advantageously be omitted.

In addition, the analysis unit is enabled, via a previously defined depth threshold value of performing a restriction of the captured depth values, in particular to a potential vaginal, testicular, or penile region, to be able to display only these relevant regions in the 3D image in this manner, for example.

Furthermore, it is possible that for a recognition procedure, multiple images or image sequences are recorded by the depth camera and the spatial coordinates of the multiple images or image sequences are captured by the analysis unit and used for the classification, so that the reliability of the result is increased. Special advantages result insofar as the spatial resolution can be increased and occlusion effects can be reduced.

A special advantage of the device according to the invention in relation to known systems is also that a determination of the phenotypic sex can be carried out in-line and in real-time by the device, in that the capture takes place directly at the slaughter pig guided on the tubular rail and the classification result is provided immediately with respect to time and is available for decisions for further processing and for valuations. Thus, in particular recognized intact boars can advantageously be supplied intentionally to checking for boar scent before processing. Furthermore, dismemberment specifications may be derived, because specific yields, for example, the proportion of lean meat, are related to the sex of the slaughter pig.

A real-time capability of the depth camera and the immediate analysis of the captured pixels are provided for this purpose, so that a very rapid and simultaneously exact identification of the sex of a slaughter pig can be provided, by which the sequence of the slaughter pig processing is not impaired.

In addition, particularly cost-effective identification of the sex of slaughter pigs within a slaughter pig processing facility is enabled by the substantially automated sequence.

Furthermore, the classification result can be stored directly in a database and is thus available for further evidentiary and checking purposes and for further analyses.

In one advantageous refinement of the invention, the depth camera is designed as a stereo camera system having a pattern projector.

By means of the pattern projector, the depth camera is capable of generating an artificial texture on the surface of the slaughter pig, in particular in the genital region.

The pattern projector can be designed as a strip projector in this case, for example.

Particularly exact capture of the relevant pixels in the region of the genital region is enabled on the basis of the pattern generated on the surface of the slaughter pig.

Furthermore, in the case of the design set forth here of the depth camera as a stereo camera system, a separate light source for illuminating the relevant region of the slaughter pig can be omitted, because the depth camera already has an installed light source in this case.

In this manner, the costs for the device according to the invention and an identification of sex which can be carried out using it can be kept low.

Furthermore, an advantageous variant of the invention provides that the depth camera is designed as a time-of-flight camera, also abbreviated hereafter as a TOF camera.

The application of a TOF camera offers the advantage in particular in this case that high image rates can be implemented thereby, in that the entire relevant region of the slaughter pig can be imaged in one recording and therefore in a very short time. Such a TOF camera is therefore particularly suitable for the real-time capture of the genital region of the slaughter pig which is provided according to the invention.

In addition, TOF cameras generally have a simple construction and can therefore be provided comparatively cost-effectively.

In a further, preferred embodiment of the device, the depth camera is a first depth camera and the depth camera capture region is a first depth camera capture region. The first depth camera is arranged in relation to the slaughter pig in this case so that the genital region can be optically captured in a back-hindquarters partial view in the first depth camera capture region and the corresponding back-hindquarters pixels can be captured with the spatial coordinates thereof.

In addition, in the embodiment described here, the device has a second depth camera having a second depth camera capture region. The second depth camera is arranged in the present case opposite to the slaughter pig such that the genital region of the slaughter pig can be captured in a belly view in the second depth camera capture region and accordingly belly-side pixels can be captured with the spatial coordinates thereof.

The spatial coordinates from the respective depth camera capture region are provided in transmittable form by the depth cameras and are captured by the analysis unit, preferably in a uniform coordinate system.

It has been found that the back-hindquarters view offers an optimum viewpoint of pronounced testicles or female sex organs, while the belly view forms an optimum viewpoint of testicles, which are concealed comparatively unobtrusively in a fold of skin in the slaughter pig in the case of a cryptorchid boar and are therefore only externally identifiable as a bulge.

The combination of two depth cameras with opposing depth camera capture regions offers the advantage in the present case that the genital region of the slaughter pig can be captured from different viewpoints and therefore the result reliability of the sex determination can be additionally optimized.

A particularly advantageous refinement of the invention additionally provides that the device has an image camera having an image camera capture region, in which light intensity values of pixels on the surface of the slaughter pig in the region of the genital region can be captured.

The image camera is connected in this case to the analysis unit and can be positioned by means of the positioning device in relation to the depth camera so that the image camera capture region and the depth camera capture region at least partially overlap in a shared capture region.

In the case of an arrangement of two opposing depth cameras according to FIG. 4, a depth camera can be assigned to a corresponding image camera, so that pixels on the surface of the slaughter pig in the region of the genital region can be captured both in the back-hindquarters viewpoint and also in the belly viewpoint.

The captured pixels are transmitted by the image camera to the analysis unit and are visualized thereby as an image of the genital region.

The provided image is used in particular to check the sex identification result and for archiving purposes.

The image camera can furthermore be designed as a color value camera, for example, so that the image provided by the analysis unit is provided as a color image.

BRIEF DESCRIPTION OF THE SEVERAL VIEWS OF THE DRAWING

The invention will be explained in greater detail as an exemplary embodiment on the basis of FIG. 1 schematic illustration—side view FIG. 2a schematic illustration with stereo camera—top view FIG. 2b schematic illustration with stereo camera and pattern projector—top view FIG. 3 schematic illustration, top view with two depth cameras.

DESCRIPTION OF THE INVENTION wherein the slaughter pig to be captured and the genital region thereof are only shown schematically and in very simplified form in the figures.

Figure 1:
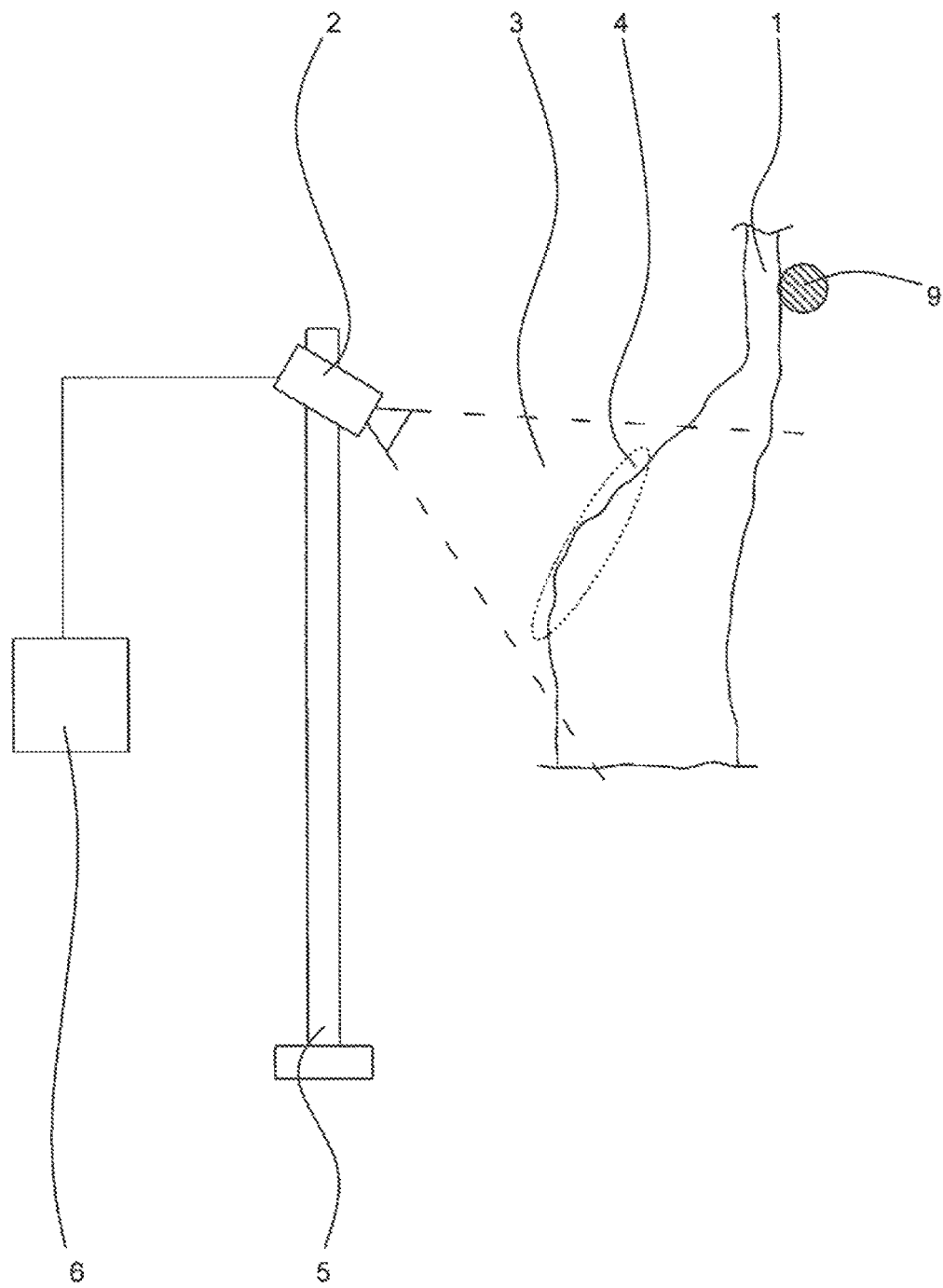
FIG. 1 shows the device according to the invention for optically identifying the sex of a slaughter pig 1 in a side view. The slaughter pig 1 is guided in the course of its processing along a tubular rail 9 past the device. The placement of the optical sex identification within the processing process of the slaughter pig 1 is performed in the present case after scalding, scraping machine, flaming furnace, and whipping, but in any case before the division. Such a placement of the optical sex identification offers the advantage in particular that existing hairs or soiling on the slaughter pig have already been removed by the previous treatments and thus an optimum sex identification can be provided.

The device according to the invention has a depth camera 2 having a depth camera capture region 3, in which a genital region 4 of the slaughter pig 1 can be captured.

In addition, spatial coordinates of pixels can be captured in the depth camera capture region 3, wherein the spatial coordinates are composed of the respective surface coordinates (x, y) and a depth value (z) of the pixels, and wherein the capture of the spatial coordinates of the pixels takes place in real-time.

The spatial coordinates are provided in transmittable form by the depth camera 2, wherein the provision of the spatial coordinates preferably also takes place in real-time.

The device furthermore has a positioning device 5, by means of which the depth camera 2 can be positioned in the required alignment in relation to the genital region 4.

The positioning of the depth camera 2 is performed in this exemplary embodiment such that it captures the genital region 4 diagonally from above.

As a further component, the device according to the invention has an analysis unit 6, which is connected to the depth camera 2 and is capable of capturing the spatial coordinates provided by the depth camera 2.

According to the invention, the analysis unit 6 performs an analysis of the captured spatial coordinates, wherein phenotypic sex features such as a testicular region or female sex organs are ascertained in particular on the basis of the depth values of the spatial coordinates. After the ascertainment of the phenotypic sex features, a classification of the slaughter pig 1 is performed by the analysis unit 6, for example, on the basis of a previously defined classifier, according to boar, barrow, sow, or cryptorchid boar, and the classification is output.

The output of the classification result is performed on a monitor, which displays the classification result by naming the phenotypic sex of the slaughter pig 1. In parallel, the classification result is transmitted, with assignment to the identification code of the slaughter animal, to a central computer having connected database.

The analysis unit identifies automatically on the basis of the depth values (z) when the slaughter pig 1 is moved by means of the tubular rail 9 into the depth camera capture region 3 of the depth camera 2 and initializes the image capture and the subsequent analysis.

Figure 2A:
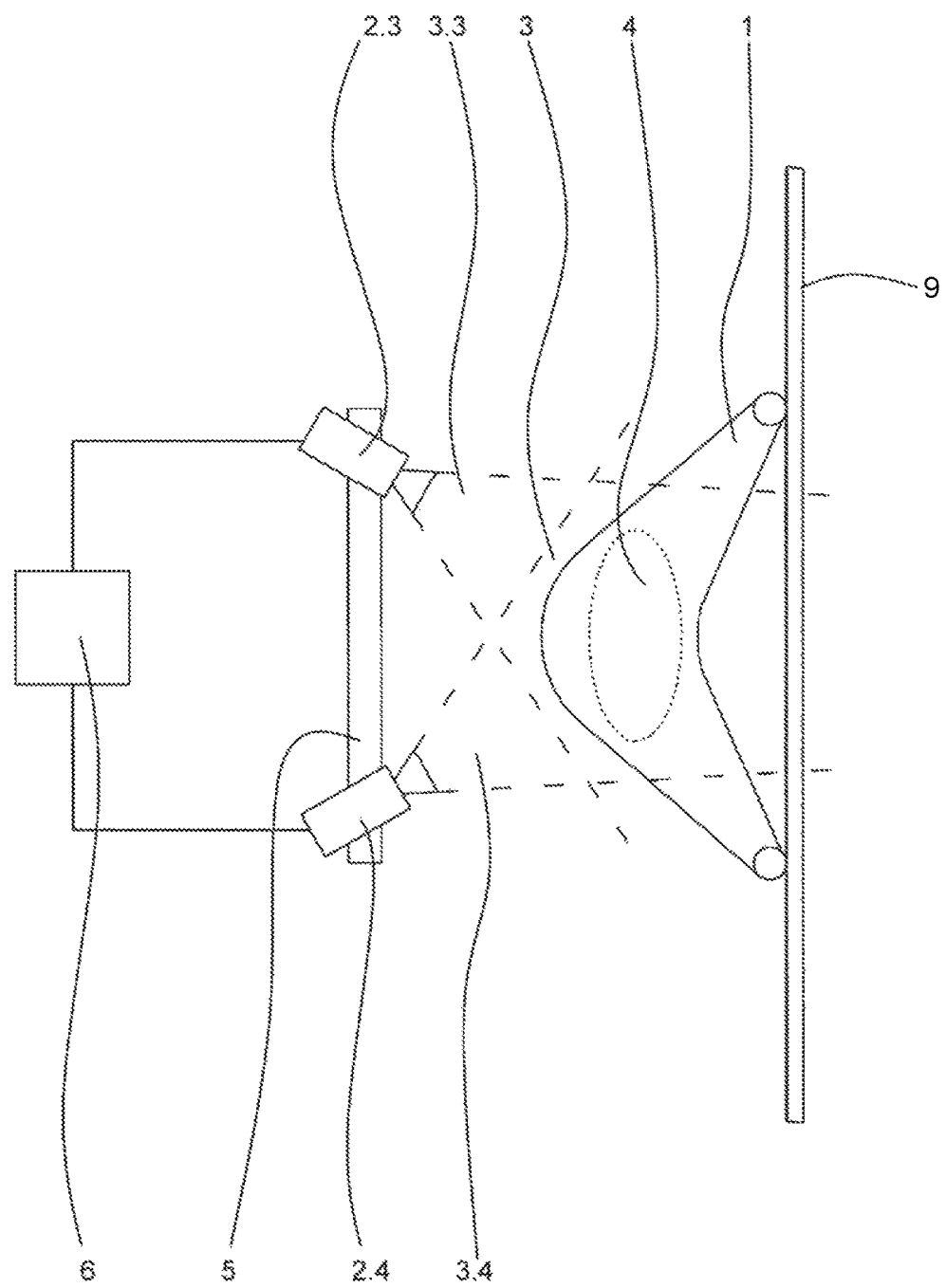

FIG. 2a shows the device according to the invention in a further exemplary embodiment as a top view.

In the exemplary embodiment shown here, the depth camera 2 is designed as a stereo camera system having two objectives 2.3 and 2.4. In the present case, each objective 2.3, 2.4 has a separate capture region 3.3, 3.4, wherein in this case the depth camera capture region 3 represents the region in which the capture regions 3.3, 3.4 of the two objectives 2.3, 2.4 of the depth camera 2 overlap.

Similarly to FIG. 1, the objectives 2.3, 2.4 of the depth camera 2 are arranged in the present case so that the genital region 4 of the slaughter pig 1 can be captured diagonally from above.

Figure 2B:
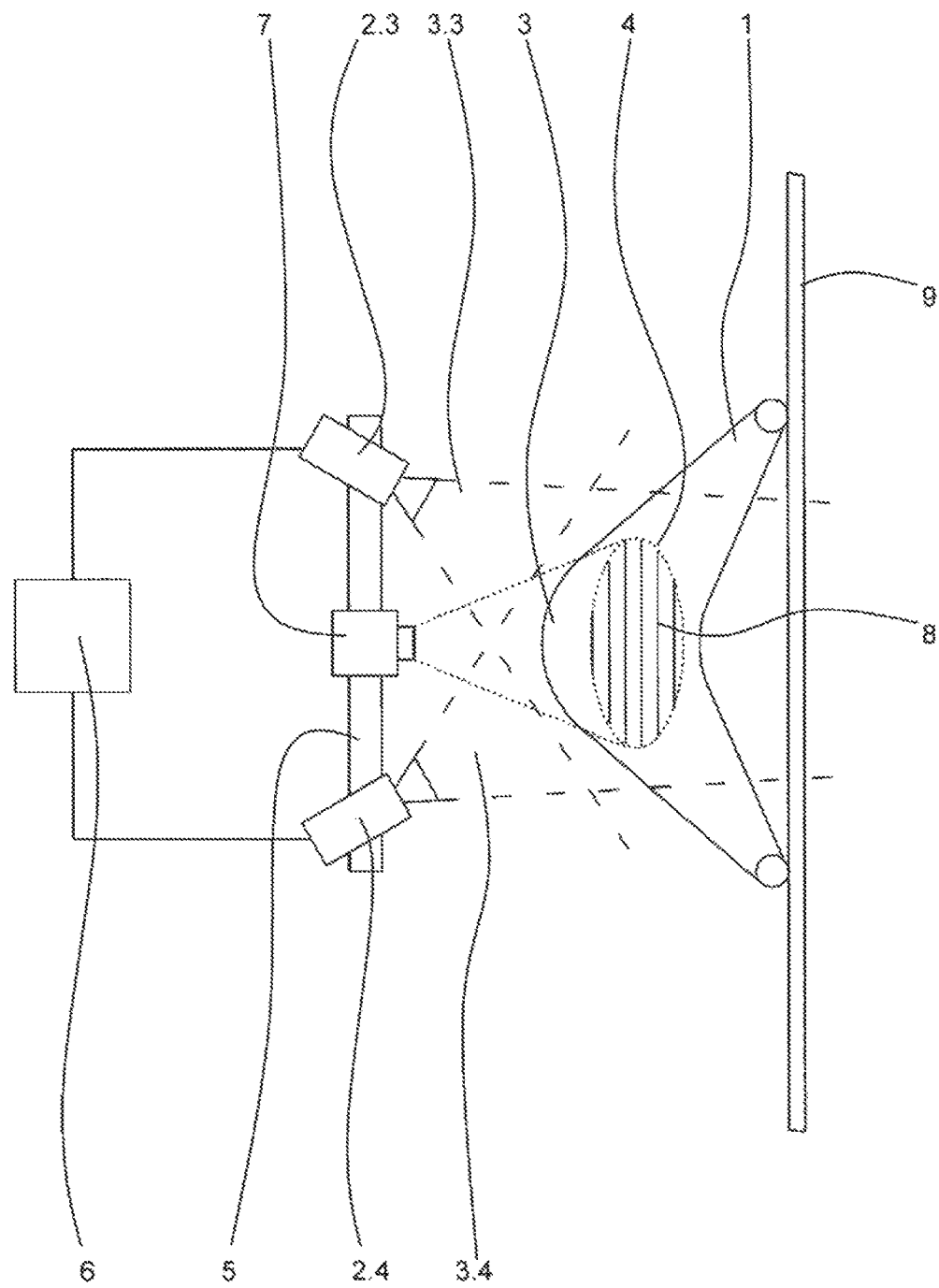

FIG. 2b shows the device according to the invention in a further exemplary embodiment as a top view, wherein this is an alteration of the exemplary embodiment shown in FIG. 2a.

In the exemplary embodiment shown here, the depth camera 2 is also designed as a stereo camera system having two objectives 2.3 and 2.4, wherein each objective 2.3, 2.4 has a separate capture region 3.3, 3.4 in the present case, wherein, as in FIG. 2a, the depth camera capture region 3 represents the region in which the capture regions 3.3, 3.4 of the two objectives 2.3, 2.4 of the depth camera 2 overlap.

Similarly to FIG. 1, the objectives 2.3, 2.4 of the depth camera 2 are arranged in the present case so that the genital region 4 of the slaughter pig 1 can be captured diagonally from above.

In the refinement disclosed here, the depth camera 2 additionally has a pattern projector 7, by means of which a texture 8, for example, a strip pattern, can be projected onto the surface of the slaughter pig 1, in particular in the region of the genital region 4.

Because the surface of the slaughter pig 1 is substantially unstructured, the application of the pattern projector 7 has proven to be particularly advantageous, because height/depth differences present on the surface stand out due to the generated texture 8 and particularly effective capture of the spatial coordinates and in particular the depth values of the respective pixels can be provided.

Figure 3:
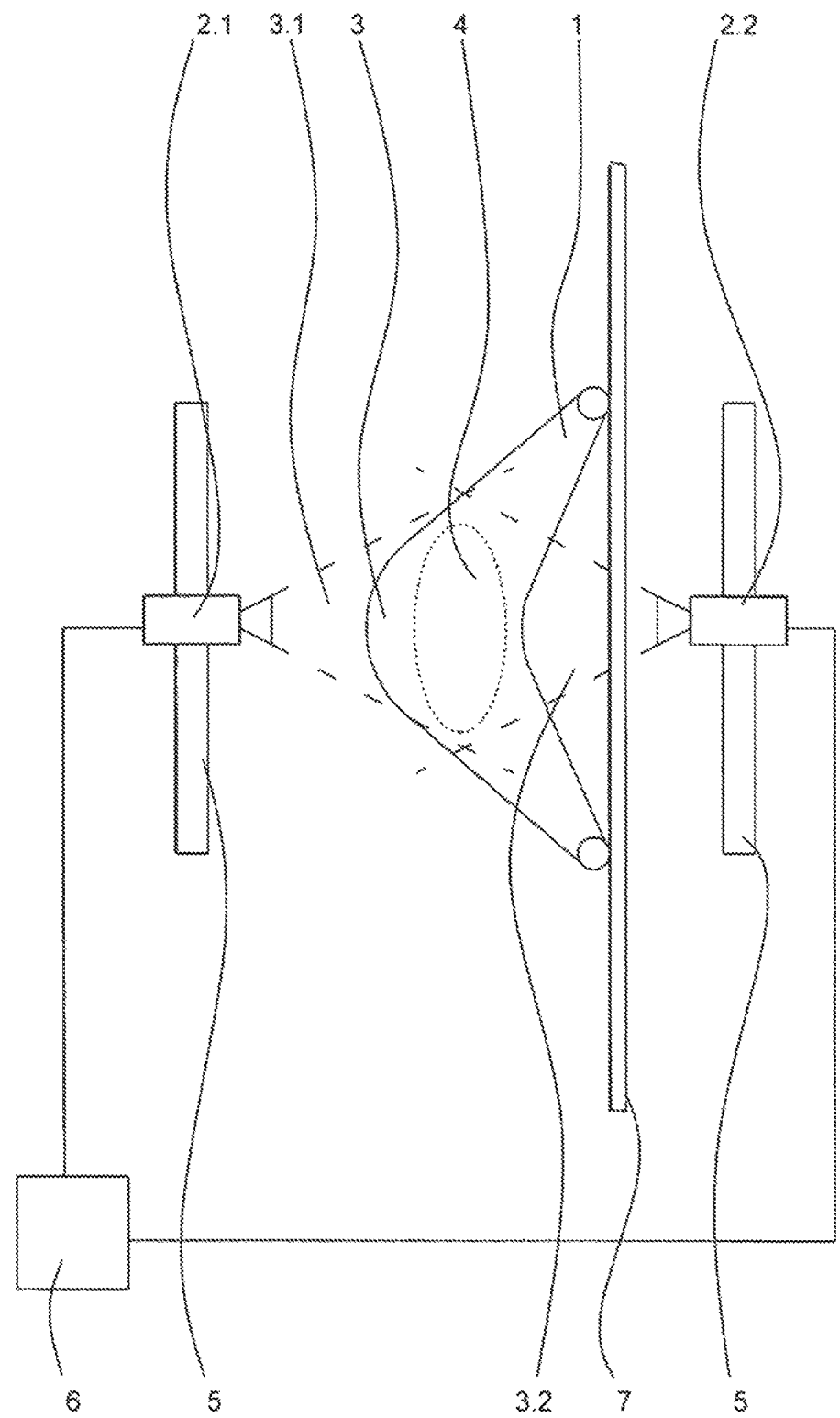

FIG. 3 shows a further embodiment of the device according to the invention in a top view.

In the illustrated embodiment of the device, the depth camera 2 is designed as a first depth camera 2.1 having a first depth camera capture region 3.1, wherein the genital region 4 of the slaughter pig 1 can be captured in a rear-hindquarters view in the first depth camera capture region 3.1.

As FIG. 3 shows, the device additionally has a second depth camera 2.2 having a second depth camera capture region 3.2.

The second depth camera 2.2 is arranged in this case so that the genital region 4 of the slaughter pig 1 can be captured in a belly view in the second depth camera capture region 3.2.

The depth cameras 2.1 and 2.2 can be positioned in congruent locations in the present case by means of the positioning device 5, so that as a special advantage, the genital region 4 of the slaughter pig 1 can be captured on both sides and the sex identification result of the device according to the invention can thus be optimized.

LIST OF REFERENCE NUMERALS 1 slaughter pig
2 depth camera
2.1 first depth camera
2.2 second depth camera
2.3 first objective
2.4 second objective
3 depth camera capture region
3.1 first depth camera capture region
3.2 second depth camera capture region
3.3 capture region of the first objective
3.4 capture region of the second objective
4 genital region
5 positioning device
6 analysis unit
7 pattern projector
8 texture
9 tubular rail

The invention claimed is:

1. A device for optically identifying the sex of a slaughtered slaughter pig, comprising:
 a depth camera having a depth camera capture region for capturing a genital region of the slaughter pig and spatial coordinates of pixels, the spatial coordinates being provided in transmittable form;
 a tubular rail on which the slaughter pig is suspended accommodated with the hind legs thereof on the tubular rail with the hind legs arranged on the tubular rail and spaced apart longitudinally along movement axis of the tubular rail;
 a positioning device supporting said depth camera and for positioning said depth camera in relation to the genital region of the slaughter pig, said positioning device arranging the depth camera orthogonally to said tubular rail; and
 an analysis unit connected to said depth camera, said analysis unit capturing the spatial coordinates provided by said depth camera and ascertaining a phenotypic sex of the slaughter pig on the basis of the spatial coordinates, the phenotypic sex being a differentiation into male uncastrated, male castrated, male having entirely or partially internal testicles, and female.

2. The device according to claim 1, wherein said depth camera is configured as a stereo camera system having a pattern projector, said pattern projector projects a texture onto the surface of the slaughter pig in the region of the genital region.

3. The device according to claim 1, wherein said depth camera is constructed as a time-of-flight camera.

4. The device according to claim 1, wherein said depth camera includes a first camera with a first depth camera capture region in which the genital region of the slaughter pig is captured in a rear-hindquarters view, and a second depth camera with a second depth camera capture region in which the genital region of the slaughter pig is captured in a belly view.

5. The device according to claim 1, which further comprises an image camera having an image camera capture region for capturing light intensity values of pixels on a surface of the slaughter pig in the region of the genital region, said image camera being connected to the analysis unit, said positioning device positioning said image camera in relation to said depth camera for at least partially overlapping the image camera capture region and the depth camera capture region in a shared capture region.

6. The device according to claim 1, wherein said analysis unit is configured to detect a movement of the slaughter pig on the tubular rail based on a change of the spatial coordinates of pixels effected by the movement of the slaughter pig on the tubular rail and to initialize a sex identifying process based on the recognition of a movement of the slaughter pig along the tubular rail.

7. The device according to claim 1, wherein said tubular rail has hooks for accommodating the hind legs.

* * * * *